United States Patent
Shimizu et al.

(10) Patent No.: US 8,290,289 B2
(45) Date of Patent: Oct. 16, 2012

(54) IMAGE ENCODING AND DECODING FOR MULTI-VIEWPOINT IMAGES

(75) Inventors: Shinya Shimizu, Yokosuka (JP); Masaki Kitahara, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 774 days.

(21) Appl. No.: 12/441,076

(22) PCT Filed: Sep. 18, 2007

(86) PCT No.: PCT/JP2007/068065
§ 371 (c)(1),
(2), (4) Date: Mar. 12, 2009

(87) PCT Pub. No.: WO2008/035665
PCT Pub. Date: Mar. 27, 2008

(65) Prior Publication Data
US 2010/0021072 A1  Jan. 28, 2010

(30) Foreign Application Priority Data
Sep. 20, 2006  (JP) .................. 2006-253845

(51) Int. Cl.
*G06K 9/00* (2006.01)
*G06K 9/36* (2006.01)
*G06K 9/46* (2006.01)
*H04N 7/12* (2006.01)
*H04N 11/02* (2006.01)
*H04N 11/04* (2006.01)
*H04B 1/66* (2006.01)

(52) U.S. Cl. ..... 382/236; 382/154; 382/233; 348/409.1; 375/240.12

(58) Field of Classification Search ............ 382/154, 382/166, 233, 236, 238; 348/409.1; 375/240.12
See application file for complete search history.

(56) References Cited

U.S. PATENT DOCUMENTS
6,055,012 A * 4/2000 Haskell et al. ............. 348/48
(Continued)

FOREIGN PATENT DOCUMENTS
CN   1864406 A   11/2006
(Continued)

OTHER PUBLICATIONS

Magnor et al. ("Multiview Image Coding in Depth Maps and 3-D Geometry for Prediction," SPIE vol. 4310, (2001), pp. 263-271).*

(Continued)

*Primary Examiner* — Yubin Hung
(74) *Attorney, Agent, or Firm* — Harness, Dickey & Pierce, P.L.C.

(57) ABSTRACT

An image encoding method includes determining a corresponding point on a target image for encoding, which corresponds to each pixel on a reference image, based on the distance from a camera used for obtaining the reference image to an imaged object, and a positional relationship between cameras; computing a parallax vector from the position of the pixel to the corresponding point in the pixel space; computing a target predictive vector having the same starting point as the parallax vector and components obtained by rounding off the components of the parallax vector; computing a target reference vector having the same starting point as the parallax vector and the same size and direction as a differential vector between the target predictive vector and the parallax vector; and setting a predicted pixel value of a pixel on the target encoding image, which is indicated by the target predictive vector, to a value of a pixel on the reference image, which is indicated by the target reference vector.

22 Claims, 9 Drawing Sheets

U.S. PATENT DOCUMENTS

| | | | |
|---|---|---|---|
| 6,266,158 B1 | 7/2001 | Hata et al. | |
| 6,430,224 B1 | 8/2002 | Naito et al. | |
| 2003/0202592 A1* | 10/2003 | Sohn et al. | 375/240.16 |
| 2005/0031035 A1 | 2/2005 | Vedula et al. | |
| 2007/0071107 A1* | 3/2007 | Ha | 375/240.24 |
| 2007/0121722 A1* | 5/2007 | Martinian et al. | 375/240.12 |
| 2007/0189396 A1 | 8/2007 | Kitahara et al. | |
| 2009/0290637 A1* | 11/2009 | Lai et al. | 375/240.02 |

FOREIGN PATENT DOCUMENTS

| | | | |
|---|---|---|---|
| CN | 1910931 A | | 2/2007 |
| EP | 1661384 A2 | | 5/2006 |
| JP | 9-261653 A | | 10/1997 |
| JP | 9-275578 A | | 10/1997 |
| JP | 10-271511 A | | 10/1998 |
| JP | 2003-009179 | | 1/2003 |
| JP | 2007-502053 A | | 2/2007 |
| KR | 2006-55534 A | | 5/2006 |
| RU | 2030119 | | 2/1995 |
| RU | 2168192 | | 5/2001 |
| RU | 2209527 | | 7/2003 |
| WO | 2005/018217 A2 | | 2/2005 |
| WO | 2006-073116 A1 | | 7/2006 |
| WO | 2007/077942 A1 | | 7/2007 |
| WO | 2007/077989 A1 | | 7/2007 |

OTHER PUBLICATIONS

Tseng et al. ("Multiview Video Coding with MPEG-2 Compatibility," IEEE Trans. Circuits and Systems for Video Technology, vol. 6, No. 4, Aug. 1996, pp. 414-419).*

ITU-T Rec.H.264/ISO/IEC 11496-10, "Editor's Proposed Draft Text Modifications for Joint Video Specification (ITU-T Rec. H. 264/ISO/IEC 14496-10 AVC), Draft 7", Final Committee Draft, Document JVT-E022, pp. 10-13, and 62-68, Sep. 2002.

Shinya Shimizu, Masaki Kitahara, Kazuto Kamikura and Yoshiyuki Yashima, "Multi-view Video Coding based on 3-D Warping with Depth Map", In Proceedings of Picture Coding Symposium 2006, SS3-6, Apr. 2006.

Oliver Faugeras, Three-Dimension Computer Vision-MIT Press; BCTC/UFF-006.37 F259 1993-ISBN:0-262-06158-9, pp. 33-68.

* cited by examiner

IMAGE ENCODING AND DECODING FOR MULTI-VIEWPOINT IMAGES

TECHNICAL FIELD

The present invention relates to encoding and decoding techniques of multi-viewpoint images.

Priority is claimed on Japanese Patent Application No. 2006-253845, filed Sep. 20, 2006, the contents of which are incorporated herein by reference.

BACKGROUND ART

Multi-viewpoint images are images obtained by photographing the same object and background thereof by using a plurality of cameras, and multi-viewpoint video images are video images of the multi-viewpoint images. Below, a video image obtained by a single camera is called a "two-dimensional video image", and a set of multiple two-dimensional video images obtained by photographing the same object and background thereof is called a "multi-viewpoint video image".

As there is a strong correlation between two-dimensional video images, the encoding efficiency thereof is improved by using such a correlation. On the other hand, when the cameras for obtaining multi-viewpoint images or multi-viewpoint video images are synchronized with each other, the images (of the cameras) corresponding to the same time have captured the imaged object and background thereof in entirely the same state from different positions, so that there is a strong correlation between the cameras. The encoding efficiency of the multi-viewpoint images or the multi-viewpoint video images can be improved using this correlation.

First, conventional techniques relating to the encoding of two-dimensional video images will be shown.

In many known methods of encoding two-dimensional video images, such as H. 264, MPEG-2, MPEG-4 (which are international encoding standards), and the like, highly efficient encoding is performed by means of motion compensation, orthogonal transformation, quantization, entropy encoding, or the like. For example, in H. 264, encoding can be performed by means of temporal correlation together with a plurality of past or future frames.

For example, Non-Patent Document 1 discloses detailed techniques of motion compensation used in H. 264. General explanations thereof follow.

In accordance with the motion compensation in H. 264, a target frame for encoding can be divided into blocks of any size, and each block can have individual motion vector and reference image. In addition, the reference image is subjected to filtering, so as to generate a video image based on a half or one-fourth pixel position, thereby implementing motion compensation of a finer accuracy of a one-fourth pixel level, and thus implementing encoding having a higher efficiency in comparison with the encoding based on any conventional international encoding standard.

Next, a conventional encoding method of multi-viewpoint images or multi-viewpoint video images will be explained.

The difference between the encoding of multi-viewpoint images and the encoding of multi-viewpoint video images is that multi-viewpoint video images have, not only a correlation between cameras, but also a temporal correlation. However, the same method using the correlation between cameras can be applied to both the multi-viewpoint images and the multi-viewpoint video images. Therefore, methods used in the encoding of multi-viewpoint video images will be explained below.

As the encoding of multi-viewpoint video images uses a correlation between cameras, the multi-viewpoint video images are highly efficiently encoded in a known method which uses "parallax (or disparity) compensation" in which motion compensation is applied to images obtained by different cameras at the same time. Here, "parallax" (or disparity) is the difference between positions, to which the same point on an imaged object is projected, on the image planes of cameras which are disposed at different positions.

FIG. 8 is a schematic view showing the concept of parallax generated between such cameras. In the schematic view of FIG. 8, image planes of cameras, whose optical axes are parallel to each other, are looked down (vertically) from the upper side thereof. Generally, such points, to which the same point on an imaged object is projected, on image planes of different cameras, are called "corresponding points".

In parallax compensation, based on the above corresponding relationship, each pixel value of a target frame for encoding is predicted using a reference frame, and the relevant prediction residual and parallax data which indicates the corresponding relationship are encoded.

By using camera parameters and the Epipolar geometry constraint, the above corresponding relationship can be represented by a one-dimensional quantity such as a distance from one (as a standard) of the cameras to the imaged object, without using a two-dimensional vector.

FIG. 9 is a schematic view showing the concept of the Epipolar geometry constraint. In accordance with the Epipolar geometry constraint, when a point in an image of a camera corresponds to a point in an image of another camera, the point of another camera is constrained on a straight line called an "Epipolar line". In such a case, if the distance from the camera to the imaged object is obtained for the relevant pixel, the corresponding point can be determined on the Epipolar line in a one-to-one correspondence manner.

For example, as shown in FIG. 9, a point of the imaged object, which is projected onto the position "m" in an image of camera A, is projected (in an image of camera B) onto (i) the position m' on the Epipolar line when the corresponding point of the imaged object in the actual space is the position M', (ii) the position m" on the Epipolar line when the corresponding point of the imaged object in the actual space is the position M", and (iii) the position m'" on the Epipolar line when the corresponding point of the imaged object in the actual space is the position M'".

FIG. 10 is a diagram for explaining that corresponding points can be obtained between a plurality of cameras when the distance from one of the cameras to the imaged object is provided.

Generally, parallax varies depending on the target frame for encoding, and thus parallax data must be encoded for each target frame. However, the distance from a camera to the imaged object is determined in accordance with physical states of the imaged object, and thus the corresponding points on images of the plurality of cameras can be represented using only data of the distance from a camera to the imaged object.

For example, as shown in FIG. 10, both the corresponding point $m_b$ in an image of camera B and the corresponding point $m_c$ in an image of camera C, which each correspond to the point $m_a$ in an image of camera A, can be represented using only data of the distance from the position of the viewpoint of camera A to the point M on the imaged object.

In accordance with the above characteristics, when the parallax data is represented by the distance from a camera of the relevant reference image to the imaged object, it is possible to implement parallax compensation from the reference image to all frames obtained by other cameras at the same time, where positional relationships between the cameras have been obtained. In Non-Patent Document 2, the number of parallax data items which must be encoded is decreased using the above characteristics, so as to perform highly efficient encoding of multi-viewpoint video images Non-Patent Document 3 is a prior-art document which discloses a technique referred to in an embodiment (explained later) of the present invention, and explanations relating to parameters for indicating positional relationships between a plurality of cameras, and parameters for indicating data of projection (by a camera) onto an image plane.

Non-Patent Document 1: ITU-T Rec.H.264/ISO/IEC 11496-10, "Editor's Proposed Draft Text Modifications for Joint Video Specification (ITU-T Rec. H.264 /ISO/IEC 14496-10 AVC), Draft 7", Final Committee Draft, Document JVT-E022, pp. 10-13, and 62-68, September 2002.

Non-Patent Document 2: Shinya SHIMIZU, Masaki KITAHARA, Kazuto KAMIKURA and Yoshiyuki YASHIMA, "Multi-view Video Coding based on 3-D Warping with Depth Map", In Proceedings of Picture Coding Symposium 2006, SS3-6, April, 2006.

Non-Patent Document 3: Oliver Faugeras, Three-Dimension Computer Vision-MIT Press; BCTC/UFF-006.37 F259 1993-ISBN:0-262-06158-9, pp. 33-68.

DISCLOSURE OF INVENTION

Problem to be Solved by the Invention

Certainly, in accordance with the method disclosed in Non-Patent Document 2, it is possible to encode parallax data with a smaller amount of code in comparison with a case in which parallax data is encoded for each target image for encoding.

As encoding of multi-viewpoint images has an object to encode each pixel of the target image for encoding, it is necessary in parallax compensation to predict the value of each pixel in the target image. However, in a method for providing the distance from a camera to the imaged object for each pixel in the reference image, the corresponding point in the reference image is fixed, and thus the corresponding point in the target image for encoding does not always coincide with the relevant pixel. In such a case, the following three methods can be easily anticipated as a method for predicting the values of all pixels in the target image for encoding.

In the first method, distance determination is performed so that each corresponding point in the target image always coincides with the relevant pixel position.

However, for a plurality of target images for encoding, the distance for always implementing such coincidence with the relevant pixel position is limited. Therefore, this method cannot achieve parallax compensation for reducing prediction error, and thus degrades the total encoding efficiency.

In the second method, the determined corresponding point in the target image for encoding is rounded off so as to coincide with the nearest pixel.

In this method, nearly accurate parallax compensation can be performed. However, the rounding-off process causes no little degradation of the prediction accuracy. In addition, the data which was obtained using the encoded parallax data is rounded. Therefore, in comparison with a case of encoding rounded data, surplus data is encoded.

In the third method, after the corresponding point in the target images (for encoding) for each pixel in the reference image is obtained, each pixel in the target image is subjected to interpolation using pixel values of the obtained corresponding points around the relevant pixel.

In the third method, the entire encoded parallax data can be used. However, in this method, the pixel values of the entire target image for encoding should be determined by interpolation using discrete pixel values, which requires very high computation cost so as to perform highly accurate interpolation. In addition, prediction error due to the parallax compensation is obtained only after the corresponding points of all pixels are determined. Therefore, in order to obtain a distance for encoding which can minimize the prediction error, the following process must be repeated for all combinations of parallax data items, where the process includes assuming parallax data for all pixels; determining corresponding points in the target image (for encoding) for all pixels in the relevant reference image by using the assumed parallax data; and generating a predicted image for the target image by subjecting the relevant image, to which discrete pixel values have been obtained, to interpolation, so as to compute prediction error. Accordingly, the amount of necessary computation is very large, and thus it is very difficult to obtain a set of optimum parallax data items.

In addition, in the method (as disclosed in Non-Patent Document 2) of providing the distance from the camera to the imaged object for each pixel in the reference image, each corresponding point in the reference image is always positioned at an integer pixel position. Therefore, it is impossible to perform highly accurate compensation corresponding to fine motion based on pixel values at decimal pixel positions (e.g., half or one-fourth pixel positions) in the reference image, as defined in motion prediction of H. 264.

Generally, for pixels at decimal pixel positions (e.g., half or one-fourth pixel positions) in the reference image, highly accurate parallax compensation can be performed by providing the distance from the camera to the imaged object. However, the number of parallax data items, which must be encoded, increases, which degrades the encoding efficiency.

In addition, even when the distance for a decimal pixel position is estimated from a distance determined for an integer pixel position, the amount of computation for obtaining the corresponding point is increased by a multiple thereof.

In light of the above circumstances, an object of the present invention is to provide image encoding and decoding techniques by which when parallax compensation for a target image for encoding is performed using parallax data which is represented based on the distance for the reference image from the camera to the imaged object, high encoding efficiency can be provided by performing parallax compensation based on decimal pixel positions while using the maximum amount of parallax data which was used for encoding, without increasing the number of parallax data items which must be encoded.

Means for Solving the Problem

In order to solving the above-described problems, the present invention provides an image encoding method of encoding multi-viewpoint images obtained by a plurality of cameras while performing inter-camera image prediction by using an already-encoded reference image and a distance from one of the cameras which was used for obtaining the reference image to an imaged object, the method comprising:

a parallax vector determination step of:

determining a corresponding point on each target image for encoding, which corresponds to each pixel on a reference image, based on the distance provided to each pixel on the reference image, and a positional relationship between the camera used for obtaining the reference image and the camera used for obtaining each target image; and computing a parallax vector from the position of the pixel on the reference image to the corresponding point on the target image in a pixel space;

a target predictive vector determination step of computing a target predictive vector having the same starting point as the parallax vector and components obtained by rounding off the components of the parallax vector to integers by omitting the decimal part of each component of the parallax vector or selecting an integer closest to the value of each component of the parallax vector;

a target reference vector determination step of computing a target reference vector having the same starting point as the parallax vector and the same size and direction as a differential vector between the target predictive vector and the parallax vector; and an inter-camera image prediction step of performing the inter-camera image prediction by setting a predicted value of a pixel on the target image, which is indicated by the target predictive vector, to a pixel value at an integer or decimal pixel position on the reference image, which is indicated by the target reference vector.

Accordingly, data of a corresponding point (which is not always positioned at an integer pixel position) on the target image for encoding, the data being provided for each integer pixel position on a reference image, is used so as to perform image prediction by means of parallax compensation using a pixel value at a decimal pixel position on the reference image, for a corresponding integer pixel position on the target image, thereby providing a high encoding efficiency.

In a typical example, the image encoding method may further comprises:

a pseudo distance determination step of determining a pseudo distance for each pixel on the reference image, where the pseudo distance indicates a corresponding point used for predicting a target image for encoding from the reference image based on the Epipolar geometry constraint; and a pseudo distance encoding step of encoding the pseudo distance determined in the pseudo distance determination step, wherein in the parallax vector determination step, the pseudo distance is used as the distance provided to each pixel on the reference image.

The pseudo distance has a value by which a point on the Epipolar straight line (on the target image) for a pixel on the reference image is specified. More specifically, the value indicates an estimated distance from the relevant camera to an object obtained at the relevant pixel on the reference image. The pseudo distance may be a distance itself, an estimated distance obtained by, for example, stereo matching, or an index corresponding to such a distance.

In accordance with the above method, even when a clear distance from the camera to the imaged object cannot be obtained, parallax compensation using a distance parameter can be performed by communicating a parameter, which was used in parallax compensation on the encoding side, to the decoding side.

In a preferable example for the typical example, the pseudo distance determination step includes:

determining an estimated parallax vector in the pixel space, wherein the end point of the vector is a corresponding point on the target image, which is computed based on an estimated pseudo distance determined by estimating a possible value and a positional relationship between the cameras, and the starting point of the vector is defined at a pixel on the reference image, to which the estimated pseudo distance is provided;

determining an estimated target predictive vector obtained by rounding off the end point of the estimated parallax vector to an integer pixel position;

determining an estimated target reference vector having the same starting point as the estimated parallax vector and the same size and direction as a differential vector between the estimated target predictive vector and the estimated parallax vector; and setting the pseudo distance to the estimated pseudo distance, which produces the minimum total sum of prediction errors obtained when inter-camera image prediction using the estimated target predictive vector and the estimated target reference vector is applied to each target image obtained by photographing the imaged object in a single state.

That is, in the pseudo distance determination step, (i) the estimated parallax vector is determined through a process similar to that preformed in the parallax vector determination step, (ii) the estimated target predictive vector is determined through a process which is similar to that performed in the target predictive vector determination step and applied to the estimated parallax vector, (iii) the estimated target reference vector is determined through a process which is similar to that performed in the target reference vector determination step and applied to the estimated parallax vector and the estimated target predictive vector, and (iv) the pseudo distance is set to the estimated pseudo distance, which produces the minimum total sum of prediction errors obtained when image prediction using the estimated target predictive vector and the estimated target reference vector is applied to each target image obtained by photographing the object in a single state.

The rounding-off method for obtaining the estimated target predictive vector may be a method of omitting the decimal part, or a method of rounding off the target value to the closest integer pixel, where the selected method should coincide with the corresponding process performed in the parallax compensation.

When the distance from the camera to the imaged object for a pixel is provided, it can be assumed that the distance from the camera to the imaged object for a position which is slightly offset from the pixel is almost the same as the distance provided for the pixel; however, the two distances do not always perfectly coincide with each other. Therefore, even when a pseudo distance which is extremely close to the actual distance is used (not to mention a case of using a suitable pseudo distance), parallax compensation may be executed using a corresponding point which produces a large prediction error.

However, in the present invention, a pseudo distance which produces a prediction error (for parallax compensation) smaller than that produced by the other distances is used. Therefore, it is possible to prevent a corresponding point which produces a large prediction error from being used in the parallax compensation, thereby providing a high encoding efficiency.

Additionally, a pseudo distance for minimizing a rate-distortion cost may be obtained, where the rate-distortion cost is computed by adding the relevant prediction error to a value obtained by multiplying a predicted value of the amount of code necessary for encoding the pseudo distance by a specific weight. The obtained pseudo distance is more preferable in consideration of the encoding efficiency although it may increase the prediction error.

If a distortion occurs in the encoding of the pseudo distance, then a decoded pseudo distance, which is obtained by decoding the encoded pseudo distance, can be used as the distance in the parallax vector determination step, so that the encoding and decoding sides can use the same parameters, thereby preventing a drift which is an encoding distortion.

In another preferable example for the typical example, the image encoding method may further comprises:

an area division setting step of setting an area division on the reference image, wherein:

in the pseudo distance determination step, the pseudo distance is determined for each area set in the area division setting step; and in the pseudo distance encoding step, the pseudo distance is encoded for each area set in the area division setting step.

In most cases, the distance from the camera to the imaged object does not change so frequently in an image, and an appropriately-limited area has the same distance value. Therefore, the number of pseudo distances to be encoded can be reduced by setting an appropriate area division and determining and encoding a pseudo distance for each divided area, thereby reducing the relevant amount of code.

In such a case, data which indicates the area division should also be encoded and transmitted to the decoding side. If the entire reference image has been subjected to an area division, and each divided area has been encoded together with area division data which indicates the area division, then the area division for determining each pseudo distance can coincide with the area division in accordance with the area division data included in encoded data of the reference image, thereby omitting the encoding of area division data for the pseudo distance.

In area division set for image encoding, the shape of each divided area often corresponds to the shape of each imaged object. In addition, the distance from the camera to the imaged object should have almost the same value in each imaged object. Therefore, the amount of code required for the area division data can be efficiently reduced by the above-described coincidence for the area division data.

However, the area division for image encoding may be set in consideration of difference in texture (or appearance). Therefore, a difference may occur between an area division set for the image encoding and an area division which produces a pseudo distance corresponding to each relevant distance. In such a case, when only data which indicates the difference is encoded, generation of a large amount of code, which is caused by the encoding with respect to the area division set on the entire image, can be prevented, and degradation in the prediction efficiency due to an error in the area division can also be prevented.

Additionally, the distance from the camera to the imaged object does not change considerably between adjacent pixels and areas in consideration of spatial characteristics of the imaged object in the actual space. Accordingly, when encoding the pseudo distance, an already-encoded pseudo distance may be selected, and data which indicates the already-encoded pseudo distance and the difference between the target pseudo distance for encoding and the selected pseudo distance may be encoded, so as to reduce the amount of code required for encoding the pseudo distance.

In addition, a set of pseudo distances provided for a reference image may be regarded as an image. Therefore, such an image may be encoded using an image encoding method such as JPEG or JPEG 2000, so as to efficiently encode the pseudo distance.

The distance from the camera to the imaged object does not change considerably also temporally. Therefore, when multi-viewpoint video images are encoded by applying the method of the present invention to a set of images obtained at the same time, a set of pseudo distances for each time may be regarded as an image, and a set of such images may be regarded as a video image. In such a case, all of the pseudo distances can be encoded using a video encoding method such as MPEG-2 or H.264/AVC, so as to efficiently encode the pseudo distance.

In the above target predictive vector determination step, the target predictive vector may be determined as a vector, each component thereof is an integral multiple of the block size for encoding, where the integral multiple is closest to the corresponding component of the parallax vector.

In order to implement highly efficient encoding of the entire multi-viewpoint video images, a residual of the parallax compensation should be highly efficiently encoded while reducing the amount of code of the pseudo distance. That is, when estimating the pseudo distance for each block to be processed in the relevant encoding, it is necessary to consider, not only the amount of code required for encoding the pseudo distance, but also the amount of code required for the residual of the block which has been subjected to parallax compensation using the relevant pseudo distance. However, a block subjected to parallax compensation using a pseudo distance provided to a target block (for encoding) on the reference image may extend over a plurality of blocks (to be processed) on the target image for encoding. In such a case, it is very difficult to evaluate the amount of code required for the residual of the parallax compensation for the relevant block, and thus it is impossible to accurately perform an optimization for implementing highly efficient encoding.

In contrast, if the target predictive vector is determined as a vector, each component thereof is an integral multiple of the block size for encoding, where the integral multiple is closest to the corresponding component of the parallax vector, as described above, then it is assured that a block (on the target image for encoding) subjected to parallax compensation always coincides with a block to be processed in encoding. Therefore, the amount of code necessary for encoding the residual of the parallax compensation for the relevant block can be computed in consideration of the encoding method for the residual of the parallax compensation. As a result, generally, highly efficient multi-viewpoint image encoding can be performed.

When encoding (or decoding) multi-viewpoint video images, a set of corresponding frames belonging to the same time may be regarded as multi-viewpoint images, to which the image encoding (or decoding) method of the present invention can be applied.

Additionally, for multi-viewpoint video images, the entire image may be encoded, not only by using the image encoding method of the present invention, but also by appropriately selecting another method such as motion compensation which uses temporal correlation, for each target for encoding, thereby improving the encoding efficiency.

Effect of the Invention

In accordance with the present invention, it is possible to accurately compute a decimal pixel position on a reference image, which corresponds to an integer pixel position on a target image for encoding, with low cost, by using data of corresponding points on the target image, which is provided based on integer pixel positions on the reference image. Therefore, it is possible to implement parallax compensation for smaller parallax, and thus highly-efficient image encoding of the whole multi-viewpoint images.

Figure 1:
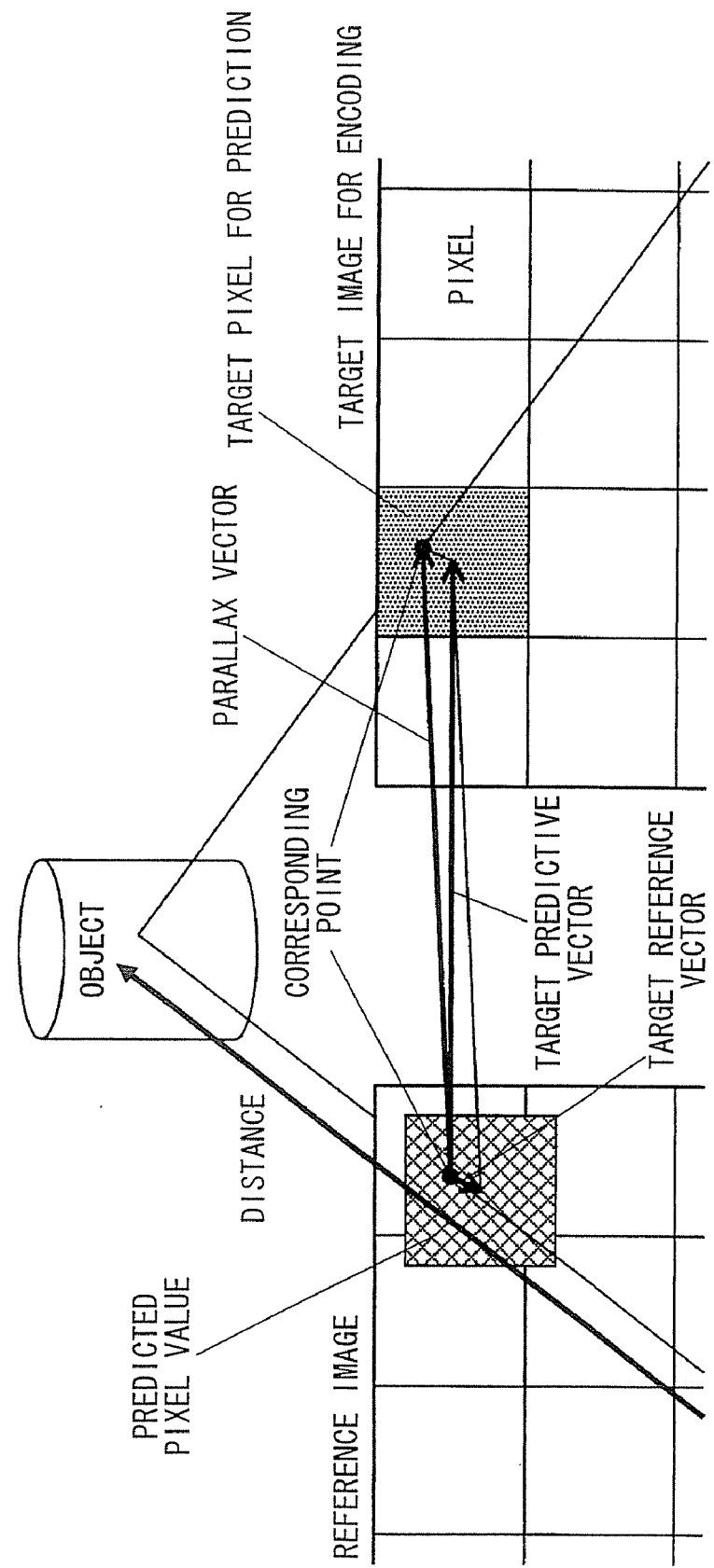
FIG. 1 is a diagram showing a relationship between vectors in the present invention.

REFERENCE SYMBOLS 100 image encoding apparatus
101 image input unit
102 reference image input unit
103 reference image memory
104 distance image generation unit
105 distance image encoding unit
106 distance image decoding unit
107 parallax-compensated image generation unit
108 target image encoding unit
200 image decoding apparatus
201 distance image decoding unit
202 reference image memory
203 parallax-compensated image generation unit
204 target image decoding unit

BEST MODE FOR CARRYING OUT THE INVENTION

Below, the present invention will be explained in detail in accordance with embodiments.

First, the principle of the present invention will be explained with reference to FIG. 1.

In the first step, for each pixel in the reference image, the corresponding point in the target image for encoding is determined by referring to the distance (assigned to each pixel in the reference image) from the camera to the imaged object and the positional relationship between cameras.

In this step, a vector which is defined in a pixel space and has the starting point at a pixel in the reference image and an end point at the corresponding pixel in the target image for encoding is called a "parallax vector". In this case, the starting point of the parallax vector is always defined at an integer pixel position, while the end point thereof is not always defined at an integer pixel position.

Next, for each parallax vector, a vector having the same starting point as the parallax vector is computed, where decimal parts of the horizontal and vertical components of the computed vector are omitted, and this vector is called a "target predictive vector".

The target predictive vector is present in a rectangle defined by the start and end points of the relevant parallax vector (i.e., rectangle whose diagonal is the parallax vector and which is defined by the coordinates of start and end points on a coordinate plane), and has an end point defined at an integer pixel position closest to the end point of the parallax vector.

In the next step, for each parallax vector, a vector which also has the same starting point as the parallax vector is computed, where the size and direction of the computed vector are equal to those of a vector which is obtained by subtracting the relevant parallax vector from the target predictive vector computed in the previous step. The currently computed vector is called a "target reference vector", and the end point thereof is not always defined at an integer pixel position.

In the present invention, for each set of the target predictive vector and the target reference vector, which are computed as described above, the value of the position (on the reference image) indicated by the target reference vector is used as a predicted value of the pixel position (indicated by the target predictive vector) on the target image for encoding, thereby implementing image prediction between the relevant cameras.

In the present invention, each corresponding point is determined based on an assumption such that the distance from the camera to the imaged object at a position which is merely slightly offset from a pixel is almost the same as the distance from the camera to the imaged object at the pixel. That is, the simpler the form of the distance from the camera to the imaged object, the more accurate the image prediction.

In contrast, the above-described second and third method (which can be easily anticipated) employ an assumption such that the texture (i.e., appearance) of the imaged object is almost the same between adjacent parts. That is, the simpler the form of the texture, the more accurate the image prediction.

When the form of the distance is compared with that of the texture for a natural image, the form of the distance tends to be simpler in consideration of a restriction on continuity in the actual space. Therefore, in comparison with the above-described methods which can be easily anticipated, the method according to the present invention can implement a more accurate image prediction, and improve the encoding efficiency.

When the target predictive vector is computed, the decimal part can be omitted as described above. However, the relevant value may be rounded off to the closest integer. In this case of rounding off the value to the closest integer, an assumption is used such that a point which is closer to a target pixel on the reference image (than the other points) has an equal distance to that of the target pixel, thereby implementing a parallax compensation which can reduce the prediction error. However, in such a case, the computation cost may be higher in comparison with the case of omitting the decimal part.

In an embodiment explained later, multi-viewpoint images obtained by two cameras A and B are encoded, where the images of camera B are encoded using the images of camera A as reference images.

In the embodiment, external parameters which indicate the positional relationship between the cameras A and B and internal parameters which indicate data of projection (by the relevant camera) onto the image plane are provided separately.

Such parameters, which are explained in detail in Non-Patent Document 3, can be determined when the cameras are set, or evaluated by using a pair of the obtained images.

Figure 2:
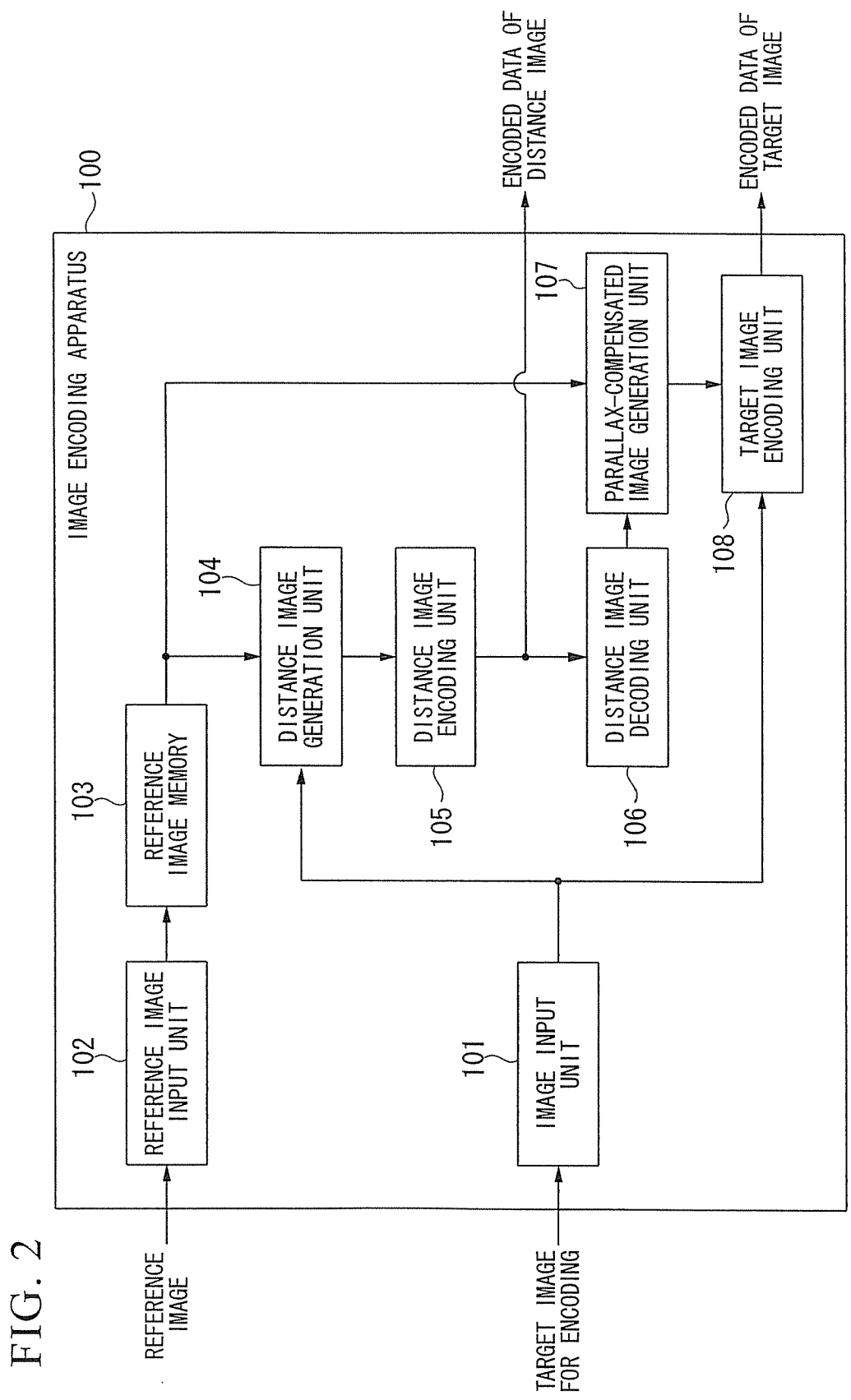
FIG. 2 is a diagram showing an example of the structure of an image encoding apparatus as an embodiment of the present invention.

FIG. 2 is a diagram showing an example of the structure of an image encoding apparatus as an embodiment of the present invention.

The image encoding apparatus 100 includes an image input unit 101 into which an original image (i.e., target image for encoding) of camera B is input; a reference image input unit 102 into which a decoded image (as a reference image) of camera A is input; a reference image memory 103 for storing each reference image; a distance image generation unit 104 for generating a distance image; a distance image encoding unit 105 for encoding the distance image; a distance image decoding unit 106 for decoding the encoded distance image; a parallax-compensated image generation unit 107 for generating a parallax-compensated image based on the reference image and the decoded distance image; and a target image encoding unit 108 for encoding a target image (for encoding) by using the parallax-compensated image.

In each of the image encoding apparatus 100 and an image decoding apparatus 200 (see FIG. 6) explained later, that is, when each apparatus operates, a distance image which indicates the distance from the actual camera to the imaged object is not distinguished from a pseudo distance image which indicates a pseudo distance used for parallax compensation. Therefore, in the following explanation, both distances are not distinguished and are each simply called a "distance image". In addition, a distance and a pseudo distance (indicated by the distance image) are also not distinguished and are each described simply as a "distance".

Below, the image encoding process performed by the image encoding apparatus 100 having the structure shown in FIG. 2 will be explained in detail with reference to flowcharts in FIGS. 3 to 5.

Figure 3:
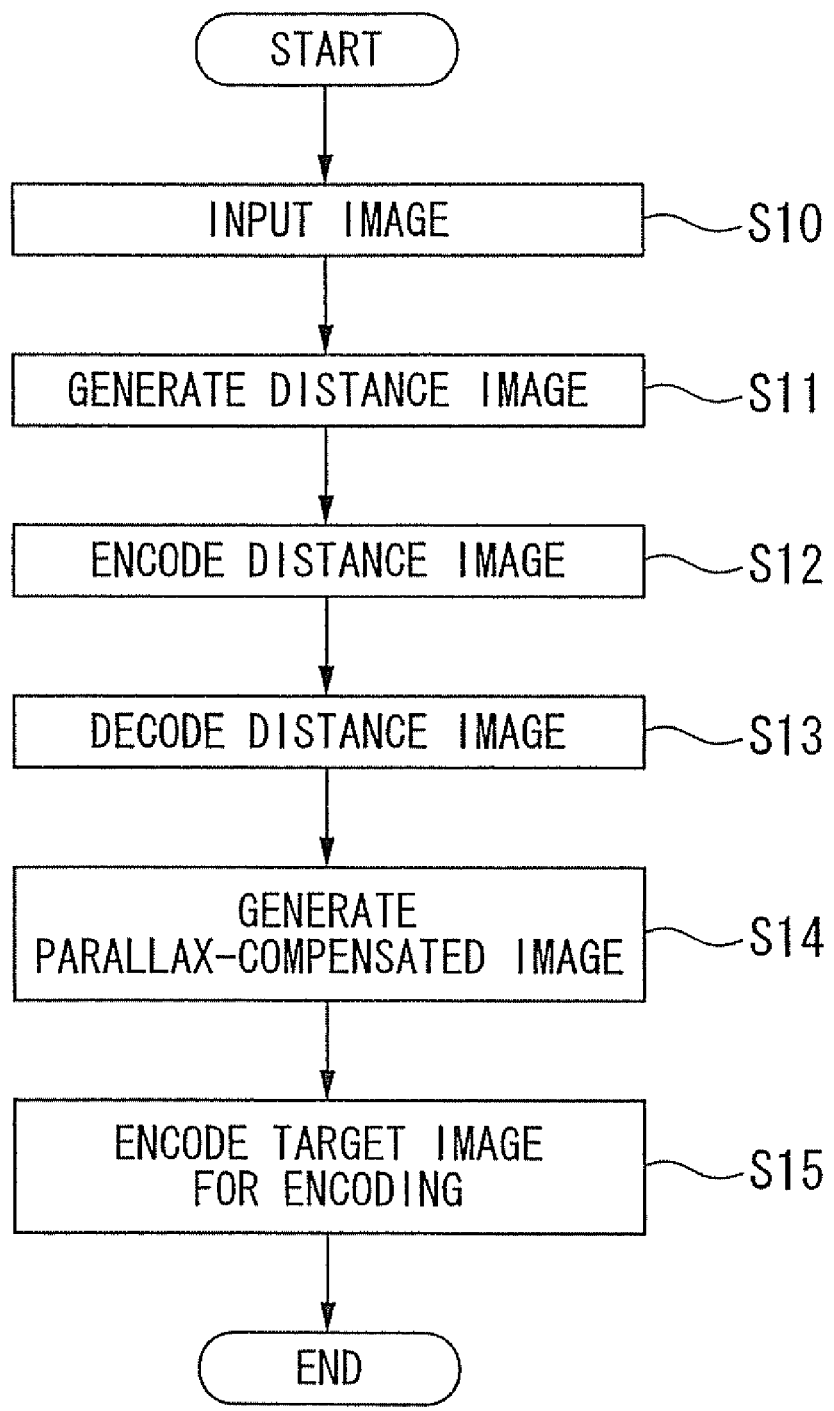
FIG. 3 is a flowchart showing the image encoding process by an image encoding apparatus.

FIG. 3 is a flowchart showing the image encoding process by the image encoding apparatus, and shows the general flow of the entire image encoding process performed by the image encoding apparatus 100.

In the image encoding apparatus 100, an image of camera B is input into the image input unit 101 (see step S10). Here, a decoded image of camera A has been input into the reference image memory 103 by means of the reference image input unit 102.

Below, the input image of camera B is called a "target image" for encoding, and the image in the reference image memory 103 is called a "reference image".

Next, a distance image for the reference image is generated by the distance image generation unit 104 by using the target image and the reference image (see step S11).

In order that the image encoding apparatus 100 and the image decoding apparatus 200 each generate a parallax-compensated image using the completely same data, the generated distance image is encoded by the distance image encoding unit 105 (see step S12), and the relevant encoded data is decoded by the distance image decoding unit 106 (see step S13).

Next, a parallax-compensated image is generated by the parallax-compensated image generation unit 107 by using the distance image, which has been obtained by the decoding, and the reference image (see step S14). Finally, the target image for encoding is encoded by the target image encoding unit 108 by using the generated parallax-compensated image (see step S15).

The image encoding process of FIG. 3 is performed when an image of camera B is encoded. Multi-viewpoint video images can be encoded by repeatedly applying the image encoding process to an image at each time.

In the distance image encoding unit 105, any known encoding method can be employed. For example, an image encoding method as JPEG2000 for a still image may be used; a video encoding method such as H. 264 may be used together with a distance image which was generated for a reference image at another time; or the relevant pixel values may be simply subjected to variable-length encoding.

However, the distance image decoding unit 106 should be a device which can decode the encoded data generated by the distance image encoding unit 105.

In addition, when the present invention is applied to multi-viewpoint video encoding, the target image encoding unit 108 can employ any encoding method which uses a parallax-compensated image.

The following are possible methods such as a method for generating and encoding a differential image between the parallax-compensated image and the target image for encoding; a method for not directly encoding the differential image but performing the encoding by using differential images at different times and motion compensation employed in H. 264; and a method for performing the encoding by using a prediction method which has a high prediction efficiency and is determined by comparing a video prediction using a parallax-compensated image with a video prediction using motion compensation.

In the present embodiment, a distance image is generated in the image encoding apparatus 100. However, a distance image, which is generated by an external device by using a sensor or the like, may be directly used. In such a case, the distance image generation unit 104 is unnecessary, and step S11 in the flowchart of FIG. 3 can be omitted.

In addition, if a reversible encoding method is used in the distance image encoding unit 105, then the distance image decoding unit 106 is unnecessary, and step S13 in the flowchart of FIG. 3 can be omitted. In this case, the distance image is directly input into the parallax-compensated image generation unit 107.

Figure 4:
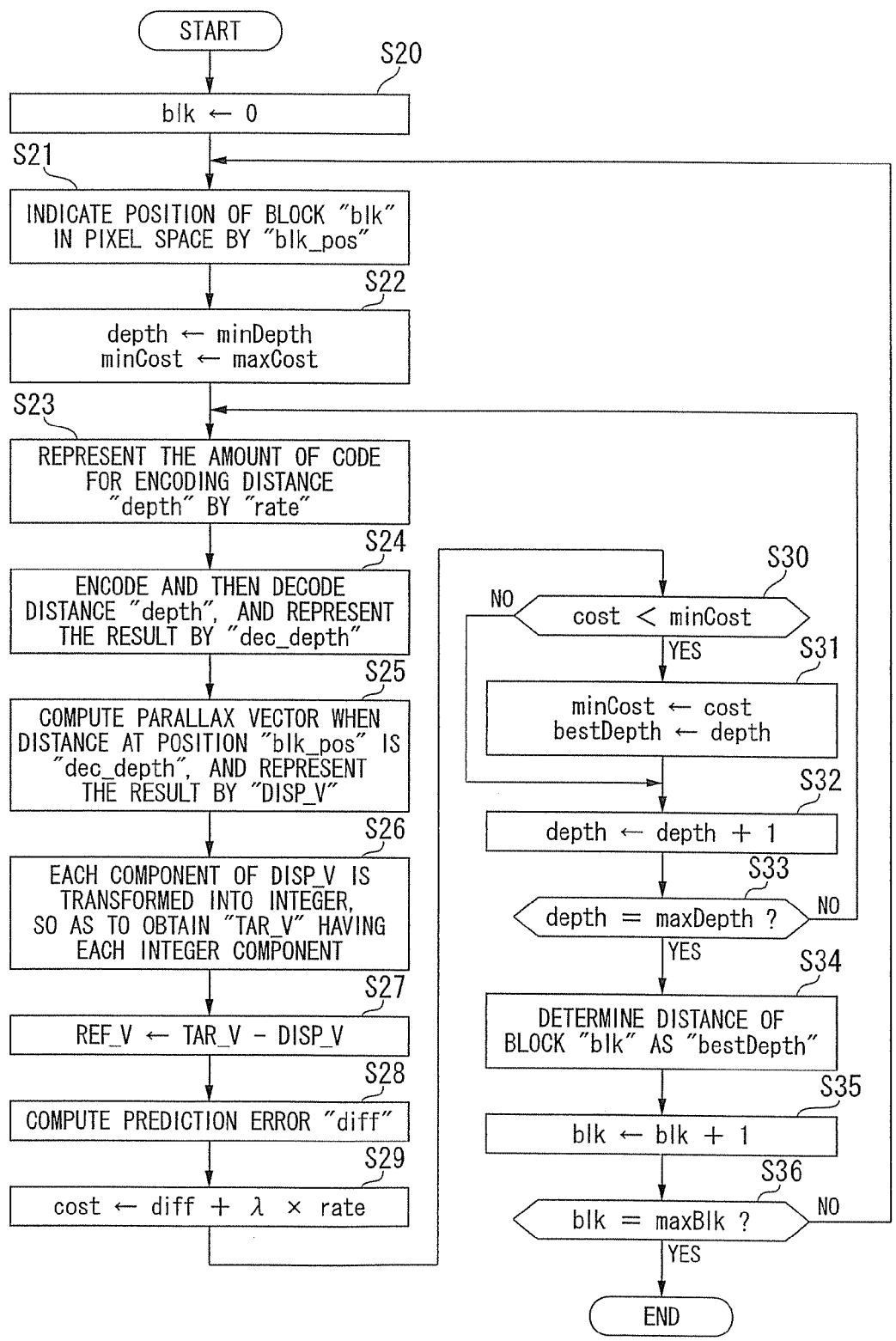
FIG. 4 is a flowchart showing the distance image generating process by a distance image generation unit.

FIG. 4 is a flowchart showing the distance image generating process by the distance image generation unit 104.

Below, the distance image generating process for generating a distance image by using the target image and the reference image (see step S11 in FIG. 3) will be explained in more detail.

In the flowchart of FIG. 4, the reference image is divided into a plurality of blocks, and the distance is computed for each block. When the size of each block is determined to be 1×1 (pixel), the distance is computed for each pixel.

It is also preferable that the above block as the unit for the distance computation coincides with the block used in the encoding process for dividing the reference image into a plurality of areas and encoding each area.

Here, "blk" is an index for indicating each block, and "maxBlk" indicates the number of blocks defined in an image.

After initializing "blk" to zero (see step S20), the process from step S21 to Step S36 is repeatedly performed for each block while "blk" is incremented by one (see step S35), until "blk" reaches "maxBlk" (see step S36).

In the process applied to each block, first, the position of the block (indicated by the index "blk") in the pixel space is obtained, and is indicated by "blk_pos" (see step S21).

Here, "depth" is an index for providing candidates for the distance, and the minimum value and the maximum value thereof are respectively represented by "minDepth" and "maxDepth", which are parameters used in encoding and voluntarily provided in consideration of a scene for photographing.

In addition, each candidate for the distance is estimated in the following steps, where the maximum value which cannot be obtained as the estimated value is represented by "maxCost". Additionally, in order to repeatedly perform the estimation, the best estimated value is represented by "minCost", and the index for the distance candidate corresponding to "minCost" is represented by "bestDepth".

After "depth" and "minCost" are respectively initialized to "minDepth" and "maxCost" (see step S22), the process from step S23 to Step S33 is repeatedly performed for each distance candidate while "depth" is incremented by one (see step S32), until "depth" reaches "maxDepth" (see step S33).

When "depth" reaches "maxDepth", it is determined that the value which has been stored as "bestDepth" is to be assigned as the distance value to the block index "blk" (see step S34).

Below, the process (from step S23 to S33) performed for each distance candidate will be explained.

First, in consideration of the encoding method used in the distance image encoding unit 105, the amount of code required for encoding "depth" (i.e., when the distance for the position "blk_pos" on the distance image is "depth") is computed, and the computed value is represented by "rate" (see step S23). In this process, "rate" may be the actual amount of code or a predicted value thereof.

Next, the value obtained when "depth" is encoded and then decoded is computed, and is represented by "dec_depth" (see step S24). Then, a parallax vector, which is determined when the distance from the camera to the imaged object at the position "blk_pos" is provided by "dec_depth", is computed, and is represented by "DISP_V" (see step S25). This parallax vector can be computed by the following formula (1).

[Formula 1]

$$\exists p \in blk\_pos$$

$$\tilde{e} = A_t R_t^{-1}(R_r A_r^{-1} \tilde{p} d + t_r - t_t)$$

$$DISP\_V = p - e \quad (1)$$

In Formula (1), variables indicated by bold letters are vectors, and variables indicated by capital letters are matrixes.

Specifically, matrix A is a matrix of the internal parameters of each camera, and matrix R is a rotation matrix defined for each camera, and vector "t" is a translational vector of each camera, where the subscript "t" indicates that the relevant parameters belong to the camera by which the target image was obtained, and the subscript "r" indicates that the relevant parameters belong to the camera by which the reference image was obtained.

In addition, "d" is the distance (indicated by the distance index "dec_depth") from the camera to the imaged object, and "~x" ("~" is disposed on "x") indicates a homogeneous vector of vector x. Additionally, "^x" ("^" is disposed on "x") indicates a homogeneous vector (among homogeneous vectors of vector x) whose final component is 1. Here, each homogeneous vector of an N-dimensional vector has N+1 components. The vector, whose first to N-th components are obtained by dividing the first to N-th components of the homogeneous vector by the (N+1)th component of the homogeneous vector, is an ordinary vector (i.e., vector x in the above example) corresponding to the relevant homogeneous vector. That is, for the N-dimensional vector, the following relationship can be obtained.

[Formula 2]

$$x = \begin{pmatrix} x_1 \\ \vdots \\ x_N \end{pmatrix} \Leftrightarrow \hat{x} = \begin{pmatrix} x_1 \\ \vdots \\ x_N \\ 1 \end{pmatrix} \Leftrightarrow \tilde{x} = \begin{pmatrix} ax_1 \\ \vdots \\ ax_N \\ a \end{pmatrix}$$

where $a \neq 0$

After DISP_V is obtained, each component thereof is transformed into an integer, so as to obtain a target predictive vector "TAR_V" having each integer component (see step S26). The method for transforming each component into an integer, either of the following methods can be employed:

(1) a method of omitting the decimal part, and (2) a method of rounding off each component to the nearest whole number.

Then, a target reference vector "REF_V" is computed by the following formula (2) (see step S27).

$$REF\_V = TAR\_V - DISP\_V \quad (2)$$

Here, for every pixel "p" included in "blk_pos", the position "p+TAR_V" on the target image and the position "p+REF_V" on the reference image are corresponding points for each other.

An estimated value which indicates the likelihood of the corresponding points, that is, a prediction error when a block at the position "blk_pos+TAR_V" on the target image is predicted using a block at the position "blk_pos+DISP_V" on the reference image, is computed, and is represented by "diff" (see step S28).

In order to estimate the likelihood, any measure can be used such as the sum of absolute values of differences, the sum of square errors, a dispersion of differential values, or a correlation coefficient. For example, the following formula (3) is an estimation formula employing the sum of absolute values of the differences.

[Formula 3]

$$diff = \sum_{p \in blk\_pos} |I_t(p + TAR\_V) - I_r(p + REF\_V)| \quad (3)$$

In Formula (3), "I" is a function which returns a pixel value (of the relevant image) at the position indicated by the argument. Although "p+TAR_V" always indicates an integer pixel position, "p+REF_V" does not always indicate an integer pixel position.

The value of each position other than integer pixel positions can be generated using values of peripheral pixels, by performing filtering or the like. In addition, it is unnecessary to compute the value which strictly corresponds to a designated position. Therefore, only limited decimal pixel positions may be subjected to such value computation, and the value at the closest point may be used.

For "rate" and "diff" which have been computed as described above, a rate-distortion cost (called "cost") obtained by the following formula (4) is computed so as to estimate each distance candidate in consideration of the encoding efficiency of multi-viewpoint video images (see step S29).

$$cost = diff + \lambda \times rate \quad (4)$$

In Formula (4), λ is an undefined Lagrange multiplier, and is a predetermined value. If each distance candidate is simply estimated based on the prediction error (without considering the encoding efficiency), λ=0. Additionally, the smaller the value of "cost", the better the estimation result.

Then the estimated value "cost" of the distance candidate "depth" is compared with the best estimated value "minCost"

for the previous distance candidates (see step S30). If the present estimation result is better, the candidate "depth" is stored as the best candidate "bestDepth", and the best estimated value "minCost" is updated by "cost" (see step S31).

After the distance candidate index "depth" is incremented by 1 (see step S32), if there is another distance candidate, a similar process is applied to the candidate (see step S33).

Figure 5:
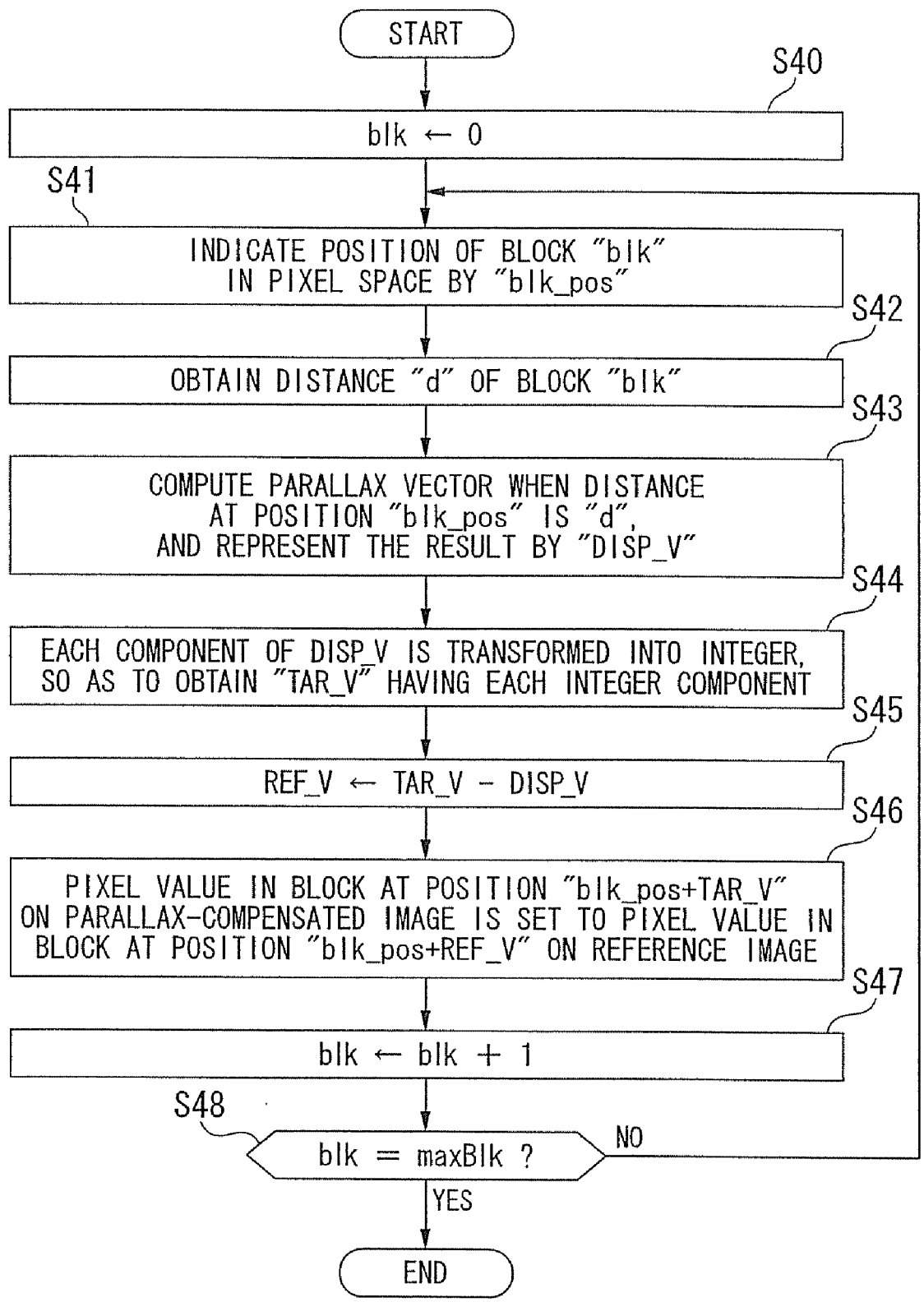
FIG. 5 is a flowchart showing the parallax-compensated image generation process by a parallax-compensated image generation unit.

FIG. 5 is a flowchart showing the parallax-compensated image generation process by the parallax-compensated image generation unit 107. Below, the parallax-compensated image generation process for generating a parallax-compensated image by using the distance image and the reference image (see step S14 in FIG. 3) will be explained in more detail.

In the flowchart of FIG. 5, for each block (in the reference image) to which the distance is provided, a parallax-compensated image is generated, where the index for indicating each block is "blk", and the number of blocks included in an image is represented by "makBlk".

After initializing "blk" to zero (see step S40), the process from step S41 to Step S48 is repeatedly performed for each block while "blk" is incremented by one (see step S47), until "blk" reaches "maxBlk" (see step S48).

In the process applied to each block, first, the position of the block (indicated by the index "blk") in the pixel space is obtained, and is indicated by "blk_pos" (see step S41), and distance "d" of block "blk" is determined by means of the distance image (see step S42).

Then, a parallax vector, which is determined when the distance from the camera to the imaged object at the position "blk_pos" is provided by "d", is computed, and is represented by "DISP_V" (see step S43), where DISP_V can be computed by the following formula (5).

[Formula 4]

$$\exists p \in blk\_pos$$

$$\tilde{e} = A_t R_t^{-1}(R_r A_r^{-1} \hat{p} d + t_r - t_t)$$

$$DISP\_V = p - e \quad (5)$$

Similar to Formula (1), in Formula (5), variables indicated by bold letters are vectors, and variables indicated by capital letters are matrixes. Additionally, matrix A is a matrix of the internal parameters of each camera, and matrix R is a rotation matrix defined for each camera, and vector "t" is a translational vector of each camera, where the subscript "t" indicates that the relevant parameters belong to the camera by which the target image was obtained, and the subscript "r" indicates that the relevant parameters belong to the camera by which the reference image was obtained. In addition, "~x" ("~" is disposed on "x") indicates a homogeneous vector of vector x, and "^x" ("^" is disposed on "x") indicates a homogeneous vector (among homogeneous vectors of vector x) whose final component is 1.

After DISP_V is obtained, each component thereof is transformed into an integer, so as to obtain a target predictive vector "TAR_V" having each integer component (see step S44). The method for transforming each component into an integer, either of the following methods can be employed:
(1) a method of omitting the decimal part, and
(2) a method of rounding off each component to the nearest whole number.

If the distance image generation was performed, a method similar to that used in step S26 in FIG. 4 (performed by the distance image generation unit 104) is used.

Then, a target reference vector "REF_V" is computed by the following formula (6) (see step S45).

$$REF\_V = TAR\_V - DISP\_V \quad (6)$$

Then, for each pixel P included in "blk_pos", the pixel value at position "p+TAR_V" on the parallax-compensated image is compensated with the value at position "p+REF_V" on the reference image (see step S46).

Here, "p+REF_V" does not always indicate an integer pixel position. The value of each position other than integer pixel positions can be generated using values of peripheral pixels, by performing filtering or the like. In addition, it is unnecessary to compute a value which strictly corresponds to a designated position. Therefore, only limited decimal pixel positions may be subjected to such value computation, and the value at the closest point may be used. However, if the distance image was generated in the distance image generation unit 104, a method similar to that used in step S28 in FIG. 4 is used.

In the above-described embodiment, if the block size is fixed to 1×1, the relevant distance is obtained for each pixel. However, the reference image may be divided into blocks, each having n×m pixels (n and m are variable), so as to determine the distance (pseudo distance) for each divided area (i.e., block), and data for indicating the area division and the distance (pseudo distance) for each area may be encoded.

In such a case of determining the distance (pseudo distance) for each block obtained by the area division of the reference image, if the entire reference image has been area-divided and each area is subjected to encoding so as to provide encoded data which includes area division data, then a similar area division may be determined in accordance with the area division data, so as to omit encoding of the area division data.

In addition, if the area division for each block (for encoding) in the reference image differs from the area division for determining the above-described distance, then in the encoding of data which indicates the area division used for determining each block to which the distance is assigned, only data, which indicates the difference from the area division indicated by area division data included in encoded data of the reference image, may be encoded so as to prevent an increase in the relevant amount of code.

Additionally, in the encoding of the above-described distance (pseudo distance), one reference distance may be selected from among already-encoded distances, and data for indicating the reference distance and the difference between a target distance for encoding and the reference distance may be encoded so as to prevent an increase in the relevant amount of code.

Also in the encoding of the above-described distance (pseudo distance), a set of pseudo distances provided for a reference image may be regarded as an image so as to encode the set of the pseudo distances by using a specific image encoding method such as JPEG.

Next, the image decoding apparatus 200 in accordance with the present invention, which decodes encoded data generated as described above, will be explained.

Figure 6:
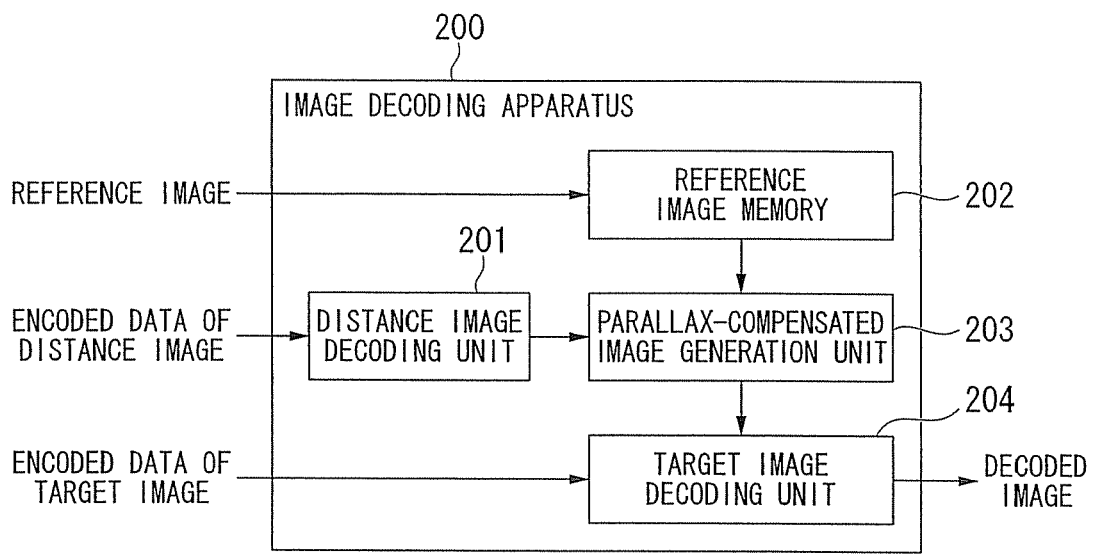
FIG. 6 is a diagram showing an example of the structure of the image decoding apparatus as an embodiment of the present invention.

FIG. 6 is a diagram showing an example of the structure of the image decoding apparatus as an embodiment of the present invention.

That is, the image decoding apparatus 200 has a distance image decoding unit 201 for decoding the distance image; a reference image memory 202 for storing each decoded image of camera A as a reference image; a parallax-compensated image generation unit 203 for generating a parallax-compensated image based on the decoded distance image and the reference image; and a target image decoding unit 204 for decoding the encoded data of the target image (for encoding) by referring to the generated parallax-compensated image.

Figure 7:
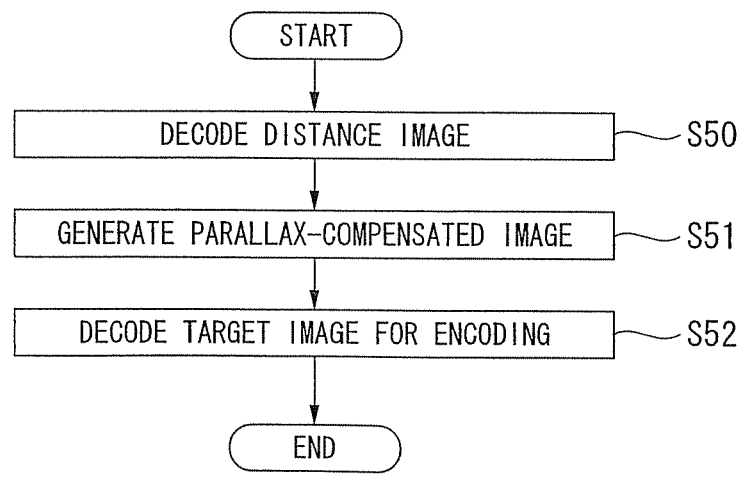
FIG. 7 is a flowchart showing the image decoding process by an image decoding apparatus.
Figure 8:
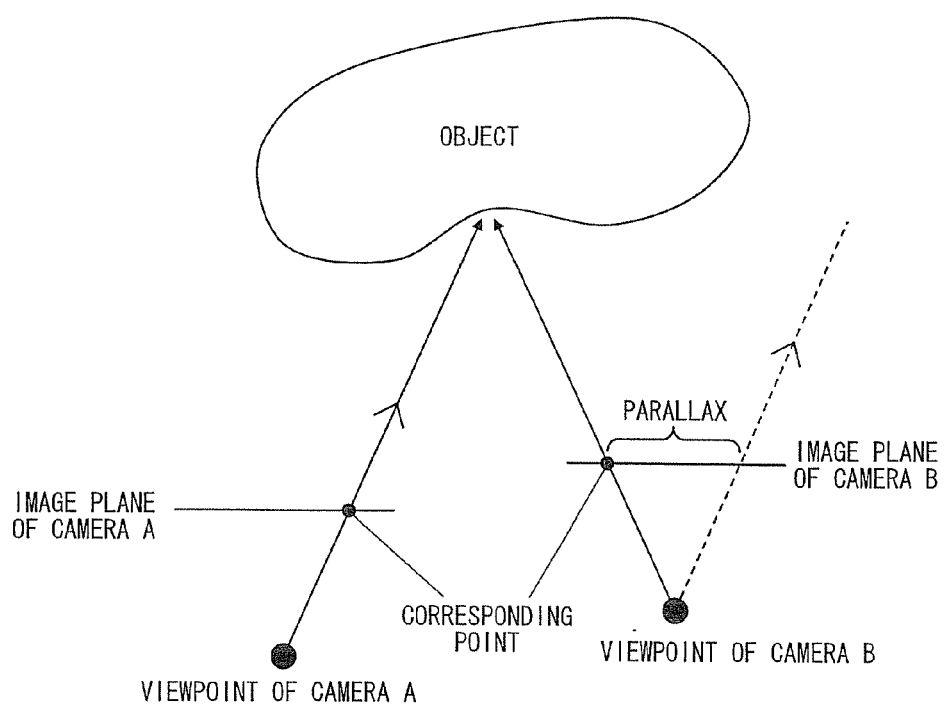
FIG. 8 is a schematic view showing the concept of parallax generated between cameras.
Figure 9:
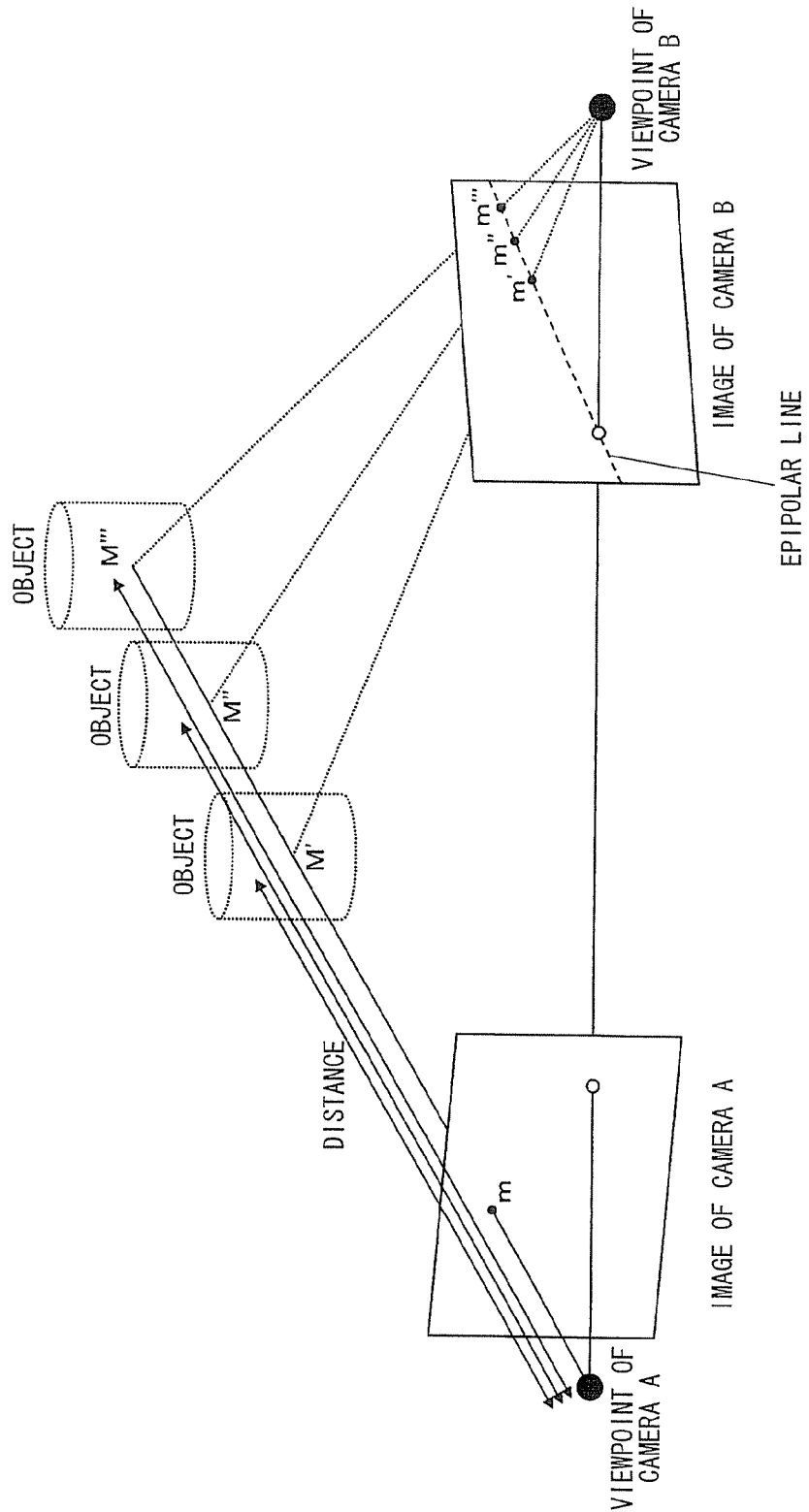
FIG. 9 is a schematic view showing the concept of the Epipolar geometry constraint.
Figure 10:
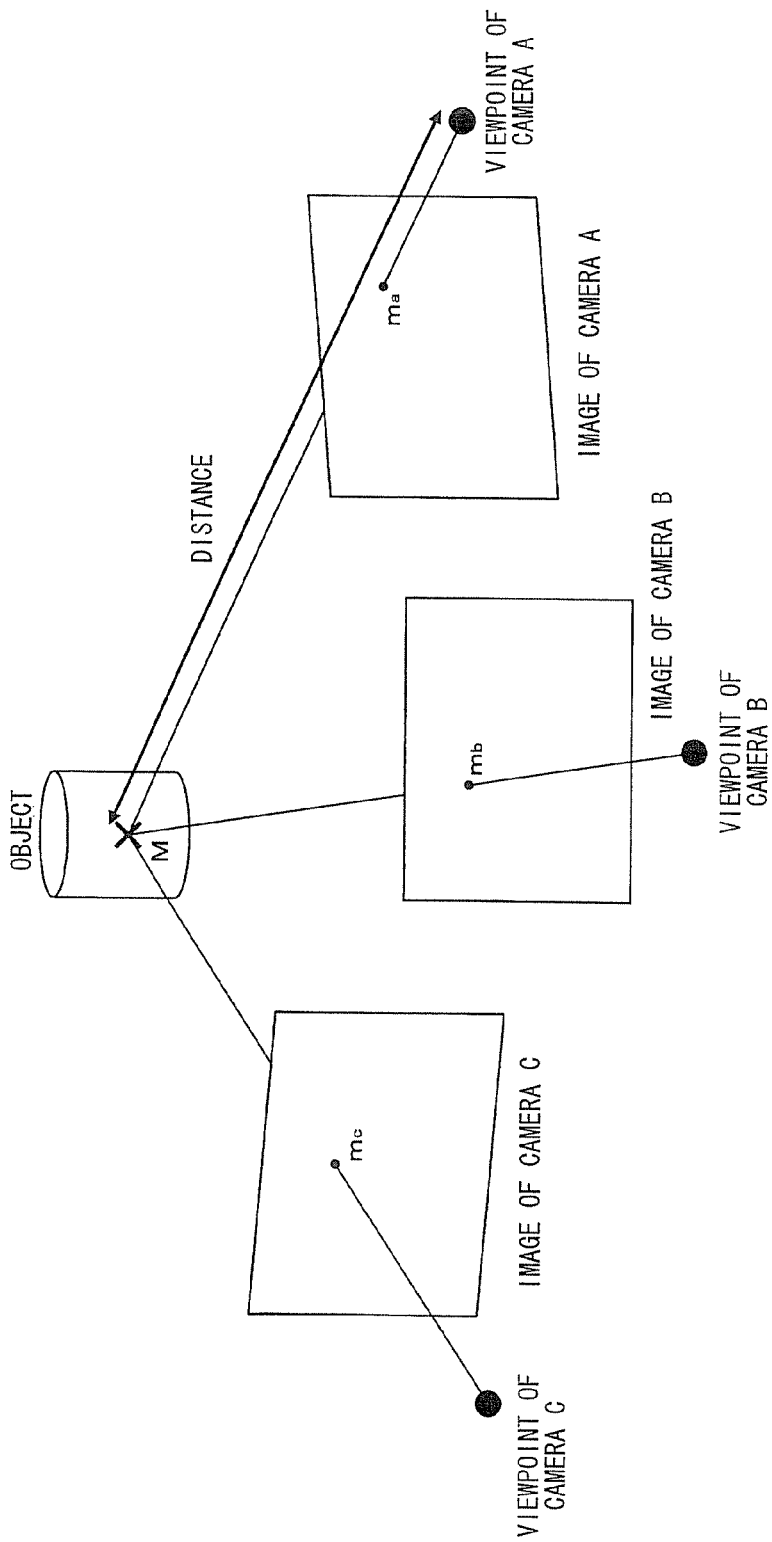
FIG. 10 is a diagram for explaining that corresponding points can be obtained between a plurality of cameras when the distance from one of the cameras to the imaged object is provided.

FIG. 7 is a flowchart showing the image decoding process by the image decoding apparatus, and shows the flow of the decoding of one frame in an image of camera B. Below, the flowchart of FIG. 7 will be explained in detail.

Here, the frame of camera A at the same time as that of the frame to be decoded has already been decoded, and the relevant decoded image has been stored as a reference image in the reference image memory 202 in advance.

First, in the distance image decoding unit 201, encoded data of the distance image is decoded (see step S50). Next, a parallax-compensated image is generated in the parallax-compensated image generation unit 203 by using the decoded distance image and the reference image stored in the reference image memory 202 (see step S51). Finally, encoded data of the target image for encoding is decoded in the target image decoding unit 204 by referring to the generated parallax-compensated image (see step S52).

Here, an encoding method used in the target image encoding unit 108 of the image encoding apparatus 100 is applied correspondingly to the process performed by the target image decoding unit 204. That is, if a method for encoding the difference between the parallax-compensated image and the target image is used in the target image encoding unit 108, the target image decoding unit 204 decodes the provided encoded data, and adds it to the parallax-compensated image, so as to obtain the decoded image of the target image.

The distance image decoding unit 201 in the image decoding apparatus 200 performs the same process as that performed in the distance image decoding unit 106 of the image encoding apparatus 100.

Additionally, the parallax-compensated image generation unit 203 in the image decoding apparatus 200 performs the same process (see FIG. 5) as that performed in the parallax-compensated image generation unit 107 of the image encoding apparatus 100.

In the present embodiment, encoded data of the distance image is provided. However, if a distance image is provided by another method, the distance image decoding unit 201 is unnecessary, and the process in step S50 in the flowchart of FIG. 7 can be omitted. In such a case, the provided distance image is directly used in the parallax-compensated image generation unit 203.

In order to generate TAR_V in the processes of step S26 in the flowchart of FIG. 4 and step S44 in the flowchart of FIG. 5, each component may be transformed not only into an integer, but also into an integral multiple of the block size defined for encoding, where the integral multiple is closest to the corresponding component of the parallax vector.

In such a case, in step S28 of the flowchart in FIG. 4, "blk_pos+TAR_V" always indicates one block (for encoding). Therefore, the distance image can be generated in consideration of relationships between the actual amount of code and the image quality, by computing the amount (called "code") of code necessary for encoding the block (of the target image) indicated by "blk_pos+TAR_V"; the sum SSD of square errors between the original image and the decoded image after the relevant encoding is performed; and "diff" indicated by the following formula (7).

$$diff = SSD + \lambda' \times code \quad (7)$$

In Formula (7), $\lambda'$ is an undefined Lagrange multiplier, and is a predetermined value.

In the above embodiment, one camera is used for obtaining the target image for encoding. However, even when the number of such cameras is two or greater, image encoding and decoding can be performed by means of the same processes as those explained above, except for the following process.

That is, when the number of the cameras is two or greater, the process from step S25 to S28 in the flowchart of the distance image generating process (see FIG. 4) is applied to each target image for encoding, and the sum of the "diff" values obtained in each process is used as "diff" so as to perform the estimation of distance candidates and generates the distance image.

The above-described image encoding process can be implemented, not only by a hardware or firmware resource, but also by a computer and a software program. Such a program may be provided by storing it in a computer-readable storage medium, or by means of a network.

While embodiments of the present invention have been described with reference to the drawings, it should be understood that these are exemplary embodiments of the invention and are not to be considered as limiting. Additions, omissions, or substitutions of structural elements, and other modifications for the above-described embodiments can be made without departing from the concept and scope of the present invention.

Industrial Applicability

In accordance with the present invention, it is possible to accurately compute a decimal pixel position on a reference image, which corresponds to an integer pixel position on a target image for encoding, with low cost, by using data of corresponding points on the target image, which is provided based on integer pixel positions on the reference image. Therefore, it is possible to implement parallax compensation for smaller parallax, and thus highly-efficient image encoding of the whole multi-viewpoint images.

The invention claimed is:

1. An image encoding method of encoding multi-viewpoint images obtained by a plurality of cameras while performing inter-camera image prediction by using an already-encoded reference image and a distance image from one of the cameras which was used for obtaining the reference image to an imaged object, the method comprising:
   using an electronic computing device to perform:
   a parallax vector determination step of:
      determining, on each target image for encoding, a corresponding point which corresponds to a pixel on a reference image, based on the distance provided to the pixel on the reference image, and a positional relationship between the camera used for obtaining the reference image and the camera used for obtaining each target image; and
      computing a parallax vector from the position of the pixel on the reference image to the corresponding point on said each target image in a pixel space;
   a target predictive vector determination step of computing a target predictive vector having the same starting point as the parallax vector and components obtained by rounding off the components of the parallax vector to integers by omitting the decimal part of each component of the parallax vector or selecting an integer closest to the value of each component of the parallax vector;
   a target reference vector determination step of computing a target reference vector having the same starting point as the parallax vector and the same size and direction as a differential vector between the target predictive vector and the parallax vector; and
   an inter-camera image prediction step of performing the inter-camera image prediction by setting a predicted value of a pixel on the target image, which is indicated by the target predictive vector, to a pixel value at an integer or decimal pixel position on the reference image, which is indicated by the target reference vector.

2. The image encoding method in accordance with claim 1, further comprising:
   a pseudo distance determination step of determining a pseudo distance for each pixel on the reference image, where the pseudo distance indicates a corresponding point used for predicting a target image for encoding from the reference image based on an epipolar geometry constraint; and
   a pseudo distance encoding step of encoding the pseudo distance determined in the pseudo distance determination step,
   wherein in the parallax vector determination step, the pseudo distance is used as the distance provided to each pixel on the reference image.

3. The image encoding method in accordance with claim 2, wherein the pseudo distance determination step includes:
   determining an estimated parallax vector in the pixel space, wherein the end point of the vector is a corresponding point on the target image, which is computed based on an estimated pseudo distance determined by estimating a possible value and a positional relationship between the cameras, and the starting point of the vector is defined at a pixel on the reference image, to which the estimated pseudo distance is provided;
   determining an estimated target predictive vector obtained by rounding off the end point of the estimated parallax vector to an integer pixel position;
   determining an estimated target reference vector having the same starting point as the estimated parallax vector and the same size and direction as a differential vector between the estimated target predictive vector and the estimated parallax vector; and
   setting the pseudo distance to the estimated pseudo distance, which produces the minimum total sum of prediction errors obtained when inter-camera image prediction using the estimated target predictive vector and the estimated target reference vector is applied to each target image obtained by photographing the object in a single state.

4. The image encoding method in accordance with claim 3, wherein in the pseudo distance determination step, the pseudo distance is determined so as to minimize a rate-distortion cost represented by the sum of the total sum of the prediction errors and a value obtained by weighing the amount of code necessary for encoding the estimated pseudo distance.

5. The image encoding method in accordance with claim 2, further comprising:
   an already-encoded pseudo distance decoding step of decoding encoded data of the pseudo distance encoded in the pseudo distance encoding step,
   wherein in the parallax vector determination step, the decoded pseudo distance obtained by the decoding in the already-encoded pseudo distance decoding step is used as the distance provided to each pixel on the reference image.

6. The image encoding method in accordance with claim 2, further comprising:
   an area division setting step of setting an area division on the reference image, wherein:
   in the pseudo distance determination step, the pseudo distance is determined for each area set in the area division setting step; and
   in the pseudo distance encoding step, the pseudo distance is encoded for each area set in the area division setting step.

7. The image encoding method in accordance with claim 6, further comprising:
   an area division encoding step of encoding data which indicates the area division set in the area division setting step.

8. The image encoding method in accordance with claim 6, wherein if the entire reference image has been subjected to an area division, and each divided area has been encoded together with area division data which indicates the area division, then in the area division setting step, a similar area division is set in accordance with the area division data, which is included in encoded data of the reference image.

9. The image encoding method in accordance with claim 7, wherein if the entire reference image has been subjected to an area division, and each divided area has been encoded together with area division data which indicates the area division, then in the area division encoding step, only data which indicates a difference from the area division indicated by the area division data included in encoded data of the reference image is encoded.

10. The image encoding method in accordance with claim 2, wherein in the pseudo distance encoding step, one of already-encoded pseudo distances is selected as a reference pseudo distance, and data for indicating the reference pseudo distance and the difference between the pseudo distance determined in the pseudo distance determination step and the corresponding reference pseudo distance are encoded.

11. The image encoding method in accordance with claim 2, wherein in the pseudo distance encoding step, a set of pseudo distances determined for one reference image is regarded as an image, and the set of the pseudo distances is encoded by a predetermined image encoding method.

12. The image encoding method in accordance with claim 1, wherein in the target predictive vector determination step, the target predictive vector is determined as a vector, each component thereof is an integral multiple of the block size for encoding, where the integral multiple is closest to the corresponding component of the parallax vector.

13. A non-transitory computer-readable storage medium which stores an image encoding program by which a computer executes the steps in the image encoding method in accordance with claim 1.

14. An image decoding method of decoding encoded data of multi-viewpoint images obtained by a plurality of cameras while performing inter-camera image prediction by using an already-decoded reference image and a distance image from one of the cameras, which was used for obtaining the reference image, to an imaged object, the method comprising:
   using an electronic computing device to perform:
   a parallax vector determination step of:
      determining, on each target image for decoding, a corresponding point which corresponds to a pixel on a reference image, based on the distance provided to the pixel on the reference image, and a positional relationship between the camera used for obtaining the reference image and the camera used for obtaining each target image; and
      computing a parallax vector from the position of the pixel on the reference image to the corresponding point on said each target image in a pixel space;
   a target predictive vector determination step of computing a target predictive vector having the same starting point as the parallax vector and components obtained by rounding off the components of the parallax vector to integers by omitting the decimal part of each component of the parallax vector or selecting an integer closest to the value of each component of the parallax vector;
   a target reference vector determination step of computing a target reference vector having the same starting point as the parallax vector and the same size and direction as a differential vector between the target predictive vector and the parallax vector; and an inter-camera image prediction step of performing the inter-camera image prediction by setting a predicted value of a pixel on the target image, which is indicated by the target predictive vector, to a pixel value at an integer or decimal pixel position on the reference image, which is indicated by the target reference vector.

15. The image decoding method in accordance with claim 14, further comprising:

a pseudo distance decoding step of decoding a pseudo distance from the encoded data, where the pseudo distance indicates a corresponding point used for predicting a target image for decoding from the reference image based on an epipolar geometry constraint, wherein in the parallax vector determination step, the pseudo distance is used as the distance provided to each pixel on the reference image.

16. The image decoding method in accordance with claim 15, wherein in the pseudo distance decoding step, the pseudo distance is decoded by decoding, from the encoded data, data which indicates a reference pseudo distance selected among already-encoded pseudo distances, and data which indicates a difference between a target pseudo distance for decoding and the reference pseudo distance.

17. The image decoding method in accordance with claim 15, wherein in the pseudo distance decoding step, a set of pseudo distances provided to one reference image is regarded as an image, and the set of the pseudo distances is decoded from the encoded data by using a predetermined image decoding method.

18. The image decoding method in accordance with claim 15, further comprising:

an area division decoding step of decoding data, which indicates an area division applied to the reference image, from the encoded data, wherein:

in the pseudo distance decoding step, the pseudo distance provided to each area indicated by the data decoded in the area division decoding step is decoded.

19. The image decoding method in accordance with claim 18, wherein if the entire reference image has been subjected to an area division, and each divided area has been encoded together with area division data which indicates the area division, then in the area division decoding step, the area division data, which is included in encoded data of the reference image, is decoded.

20. The image decoding method in accordance with claim 18, wherein if the entire reference image has been subjected to an area division, and each divided area has been encoded together with area division data which indicates the area division, then in the area division decoding step, data, which indicates a difference from the area division indicated by the area division data included in encoded data of the reference image, is decoded, and an area division is set using the area division data included in the encoded data of the reference image and the data which indicates the difference.

21. The image decoding method in accordance with claim 14, wherein in the target predictive vector determination step, the target predictive vector is determined as a vector, each component thereof is an integral multiple of the block size for decoding, where the integral multiple is closest to the corresponding component of the parallax vector.

22. A non-transitory computer-readable storage medium which stores an image decoding program by which a computer executes the steps in the image decoding method in accordance with claim 14.

* * * * *